Patented Aug. 13, 1946

2,405,817

UNITED STATES PATENT OFFICE 2,405,817

COPOLYMER OF STYRENE AND FUSIBLE PARTIAL POLYMER OF DIVINYL BENZENE

Gaetano F. D'Alelio, Pittsfield, Mass., assignor to General Electric Company, a corporation of New York No Drawing. Application June 23, 1942, Serial No. 448,160

2 Claims. (Cl. 260—42)

This invention relates to the preparation of copolymers and more particularly to the preparation of copolymers having one constituent formed from a soluble, fusible heat-convertible polymer of divinyl benzene.

Present production methods for the preparation of divinyl benzene (monomer) are carried out in such a manner that the resulting product is an inseparable mixture of about 20–30% divinyl benzene in diethyl benzene. The presence of this large amount of diethyl benzene precludes the use of this solution in many copolymer applications, e. g., castings, moldings, etc. I have now discovered that by isolating a soluble, fusible polymer of divinyl benzene from its solution in diethyl benzene, as described in my copending applications, Serial No. 448,155, 448,156, 448,157, 448,158, and 448,159, filed concurrently herewith and assigned to the same assignee as the present invention, I may use this soluble, fusible and heat-convertible resin for a host of applications from which it would otherwise have been excluded.

The isolated, soluble, fusible polymer of divinyl benzene possesses a variety of outstanding properties which make it extremely desirable for commercial use. For example, these partial polymers may be stored for long periods of time without fear of advancing to a more highly polymerized state. Under the influence of heat the soluble, fusible polymer cures to a hard infusible and insoluble mass. It is extremely soluble in other unsaturated monomers, e. g., styrene, ethyl acrylate, ethyl methacrylate, vinyl acetate, etc., as well as in aromatic solvents, e. g., benzene, toluene, diethyl benzene, etc., and certain petroleum fractions, e. g., aromatic hydrocarbon oil fractions as well as the chlorinated products of these. It may be copolymerized with a variety of unsaturates, e. g., styrene, ethyl acrylate, ethyl methacrylate, vinyl acetate, etc. The partial polymer yields an extremely hard, abrasive-resistant mass when completely cured. Under the influence of heat, the resin can be caused to set to a hard, infusible, abrasive-resistant and solvent-resistant state. This polymer is non-inflammable. It is acid- and heat-resistant.

By virtue of these extraordinary properties possessed by the isolated, soluble, fusible polymer and the insoluble, infusible polymer of divinyl benzene a wide field of industrial applications is opened. For example, I may use the soluble, fusible polymer in coating compositions alone or modified with some other resin, e. g., polystyrene. I may prepare casting resins from this polymer by, for example, dissolving the resin in some unsaturated monomer having at least one $CH_2=C<$ grouping and copolymerizing the solution under the influence of external heat and a catalyst for polymerization.

Where so desired the copolymerizable materials of this invention containing the soluble, fusible divinyl benzene polymer may be used as molding compositions since they are heat-convertible. This property permits the molded resins to be extracted from the mold while hot and in addition yields a product having excellent heat-resistant properties. It is not necessary to copolymerize the divinyl benzene with the other copolymerizable constituent, namely a compound having at least one $CH_2=C<$ grouping, prior to molding. I may mold the solution of divinyl benzene in an unsaturated monomer, e. g., styrene, ethyl acrylate, etc., in the presence of benzoyl peroxide under elevated temperature and pressure, thus converting a solution containing a relatively large quantity of a thermoplastic material to a heat-hardened, infusible, insoluble piece. When the partial polymer is molded by itself under similar conditions a hard, brittle, easily fractured piece is obtained. Modifying the soluble, fusible polymer with selected copolymerizable components has the effect of imparting whatever properties are desired. The heat-convertible copolymers may be modified further by including fillers, opacifiers, pigments, etc.

I may also use the copolymers of this invention as the cohesive ingredient in laminates. Such laminates are fire- and heat-resistant and may be used for panels and other construction parts where fire-proofing and heat-resistance are required, e. g., boiler rooms.

When the divinyl benzene polymer is dissolved in hydrocarbons and chlorinated hydrocarbon oils in the presence of a copolymerizable material and further polymerized, a gel is formed which may be used for several commercial applications. For instance, I may use this gel as a dielectric in capacitors or bushings.

By further modifying the partial polymer of divinyl benzene with other copolymerizable groups I may obtain copolymers which may be used for wire coverings and other types of insulation including heat and electric insulation, acid- and alkali-resistant impregnants, storage battery plate separators, case-hardening other plastics, e. g., styrene, ethyl acrylate, etc., flexible non-inflammable tapes, grinding wheels, refractory materials, etc.

The copolymers of this invention are prepared by first dissolving the polymer of divinyl benzene in the copolymerizing constituent, for instance a compound containing at least one $CH_2=C<$ grouping and subsequently under the influence of heat and a catalyst this solution is polymerized.

As copolymerizable components I may use, e. g., acrylic acids and derivatives of acrylic acids, e. g., acrylic acid, methacrylic acid, methyl acrylate, ethyl acrylate, methyl methacrylate, ethyl methacrylate, benzyl acrylate, benzyl methacrylate, propyl acrylate, isobutyl acrylate, cyclopentyl acrylate, phenyl acrylate, chloroacrylic acid, methyl chloroacrylate, ethyl bromoacrylate, acrylonitrile, methacrylonitrile, etc., vinyl compounds and derivatives of vinyl compounds, e. g., vinyl chloride, vinyl bromide, vinyl iodide, vinylidene chloride, etc., vinyl acetate, vinyl propionate, vinyl butyrate, vinyl isobutyrate, vinyl cyclopentanoate, vinyl benzoate, etc., allyl esters, e. g., allyl acetate, allyl propionate, allyl butyrate, allyl isobutyrate, methallyl acetate, methallyl benzoate, etc., allyl halides, e. g., allyl chloride, allyl iodide, allyl bromide, methallyl chloride, etc., ethers, e. g., allyl methyl ether, methallyl methyl ether, vinyl methyl ether, vinyl ethyl ether, etc., ketones, e. g., methyl vinyl ketone, ethyl vinyl ketone, allyl methyl ketone, allyl ethyl ketone, allyl propyl ketone, allyl isobutyl ketone, etc.

In addition to the above I may also use compounds in which a multiplicity of $CH_2=C<$ groups occur, e. g., diallyl malonate, divinyl ether, diallyl ether, diallyl phthalate, allyl acrylate, diallyl succinate, di-(2-chloroallyl) succinate, etc. Additional examples are given in my U. S. patent, 2,260,005, dated October 21, 1941.

In carrying this invention into effect I may use as catalyst in the polymerizations of this invention ozone, ozonides, inorganic super oxides such as barium peroxide, sodium peroxide, etc., aliphatic acyl peroxides, e. g., acetyl peroxide, lauryl peroxide, stearyl peroxide, etc., peroxides of the aromatic acid series, e. g., benzoyl peroxide, mixed organic peroxides, e. g., acetyl benzoyl peroxide, ketone peroxides, e. g., acetone peroxide, triacetone peroxide, alkyl derivatives of hydrogen peroxide, e. g., ethyl hydrogen peroxide, diethyl peroxide, etc., various per compounds such as perborates, persulfates, perchlorates, etc., aluminum salts such as the halides, e. g., aluminum chloride, organic and inorganic acids such as methacrylic, hydrofluoric, etc., metal compounds of the unsaturated acids as, for instance, cobalt and manganese resinates, linoleates, maleates, etc., hydrogen peroxide, etc. However, benzoyl peroxide is a preferred catalyst. Any suitable amount of catalyst may be used but, in general, the catalyst concentration will be within the range of 0.1-2.0 per cent by weight of the whole.

In order that those skilled in the art may better understand the teachings of this invention, the following examples are given.

Example 1

A piece of polyisobutylene was allowed to stand in a 50% solution of the isolated, soluble, fusible polymer of divinyl benzene in styrene for one week. The material partially dissolved. The solution was decanted and placed in a vial. The residue which comprised a portion of highly swelled polyisobutylene was also placed in a vial. Both were heated at 50° C. for 2 days and at 65° C. for 1 day. At this time the decanted solution was found to have formed a clear, hard casting. The polyisobutylene had formed a tough, rubbery material. The samples were again examined after curing overnight at 100° C. The casting from the decanted solution (high in styrene and divinyl benzene and low in polyisobutylene) was very hard and fractured only after repeated blows with a hammer. The fraction high in polyisobutylene and low in styrene and divinyl benzene, although still slightly soft, was distinctly tougher and harder than the unmodified polyisobutylene.

Example 2

A piece of polyethylene was allowed to stand in a 50% solution of the isolated, soluble, fusible polymer of divinyl benzene in styrene for one week. The material swelled only slightly. The supernatant solution was decanted and the residue placed in the oven at 50° C. for 2 days and then at 65° C. for 1 day. The heating operation was concluded by subjecting the treated polyethylene to 100° C. overnight. The cooled product was noticeably harder than the original material.

Example 3

| | Parts by weight |
|---|---|
| 23% solution of divinyl benzene in diethyl benzene | 72 |
| Styrene | 8.5 |
| Transil oil 10C (a mineral oil) | 11.5 |
| Benzoyl peroxide | 0.25 |

Example 4

| | Parts by weight |
|---|---|
| 23% solution of divinyl benzene in diethyl benzene | 72 |
| Pyranol (a chlorinated diphenyl composition) | 11.5 |
| Styrene | 8.5 |
| Benzoyl peroxide | 0.25 |

Examples 3 and 4 were treated alike. These ingredients were placed in a container and sealed. The solutions were subjected to 80° C. for 3 days. When examined the clear castings were firm gels. These gels may be used as dielectric materials and insulators.

Example 5

| | Parts by weight |
|---|---|
| Isolated soluble, fusible polymer of divinyl benzene | 25 |
| Styrene | 12.5 |
| Transil oil 10C | 25 |
| Benzoyl peroxide | 0.185 |

Example 6

| | Parts by weight |
|---|---|
| Isolated, soluble, fusible polymer of divinyl benzene | 25 |
| Styrene | 12.5 |
| Pyranol | 25 |
| Benzoyl peroxide | 0.185 |

In both Examples 5 and 6 the samples were heated overnight at 60° C. and baked at 110° C. for 24 hours. Firm gels were obtained in each case which were much firmer than those of Examples 3 and 4.

Example 7

Four samples having the following formulations were prepared to be used for casting resins.

| Divinyl benzene partial polymer | Ethyl acrylate | Benzoyl peroxide |
|---|---|---|
| Parts | Parts | Parts |
| 1 | 99 | 0.5 |
| 5 | 95 | 0.5 |
| 10 | 90 | 0.5 |
| 20 | 80 | 0.5 |

When the above samples were heated in closed containers at 60° C. for a period of 10 minutes the polymerization became so rapid that the castings exploded. Less drastic treatment yielded satisfactory cast pieces.

Example 8

Four samples having the formulations indicated below were prepared to be used in the preparation of casting resins.

| Isolated, soluble fusible divinyl benzene polymer | Styrene | Benzoyl peroxide |
|---|---|---|
| Parts | Parts | Parts |
| 1 | 99 | 0.5 |
| 5 | 95 | 0.5 |
| 10 | 90 | 0.5 |
| 20 | 80 | 0.5 |

Each of the above samples was heated for 10 minutes at 60° C. and allowed to stand overnight. This was followed by heating for 20 minutes at the same temperature and standing overnight at room temperature. The samples were now heated to 80° C. for 20 hours and then 7 hours at 110° C. The first two samples contained some bubbles whereas the latter two were completely homogeneous. More accurate control of the temperature during polymerization yields satisfactory casting compositions for the first two compositions. The castings were extremely hard.

When no elevated temperatures were used, a composition containing 20 parts of the isolated, soluble, fusible divinyl benzene polymer and 80 parts of styrene in the presence of a catalyst of polymerization formed a fixed gel after standing for 3 weeks.

Example 9

Four samples having the following formulations were prepared to be used in the preparation of casting resins.

| Isolated, soluble, fusible divinyl benzene polymer | Ethyl methacrylate | Benzoyl peroxide |
|---|---|---|
| Parts | Parts | Parts |
| 1 | 99 | 0.5 |
| 5 | 95 | 0.5 |
| 10 | 90 | 0.5 |
| 20 | 80 | 0.5 |

When each of the above compositions was baked at 70° C. for intermittent periods a hard, gel-like casting was eventually obtained.

Example 10

Four samples of the following formulations were prepared to be used in the preparation of casting resins.

| Isolated, soluble, fusible divinyl benzene polymer | Vinyl acetate | Benzoyl peroxide |
|---|---|---|
| Parts | Parts | Parts |
| 1 | 99 | 0.5 |
| 5 | 95 | 0.5 |
| 10 | 90 | 0.5 |
| 20 | 80 | 0.5 |

When the above samples were placed in an oven at 60° C. overnight good castings were obtained. The reaction appeared most active with a large percentage of vinyl acetate. The castings were hard and transparent.

Example 11

Parts by weight
Isolated, soluble, fusible divinyl benzene polymer _____ 30
Styrene _____ 110
Benzoyl peroxide _____ 0.2

The paste formed by mixing the above was molded 20 minutes at 150° C. and 4500 lbs./sq. in. pressure. The piece, which was removed from the mold while hot, was clear and colorless. This thermoset material was somewhat brittle although this feature could be improved by the addition of fillers and plasticizers.

Example 12

Parts by weight
Isolated, soluble, fusible divinyl benzene polymer _____ 30
Methyl methacrylate _____ 10
Benzoyl peroxide _____ 0.2

These ingredients were treated in the same manner as described in the preceding example. A thermoset, hard, clear (only slight discoloration), molded piece was obtained.

Example 13

Parts by weight
Isolated, soluble, fusible divinyl benzene polymer _____ 30
Diallyl phthalate _____ 10
Benzoyl peroxide _____ 0.2

This paste was treated as indicated in Example 11. A hard, thermoset, only slightly discolored, molded piece was obtained.

Example 14

Parts by weight
Isolated, soluble, fusible divinyl benzene polymer _____ 20
Styrene _____ 10
Asbestos _____ 20
Benzoyl peroxide _____ 0.15

The above ingredients were mixed to form a thick paste. This composition was molded for 15 minutes at 150° C. and 4500 lbs./sq. in. pressure. The disc was removed while hot. A well knit, heat-resistant piece was obtained.

Example 15

Parts by weight
Isolated, soluble, fusible divinyl benzene polymer _____ 20
Styrene _____ 10
Benzoyl peroxide _____ 0.15
Powdered mica _____ 20

A paste was formed of the above ingredients and this composition was molded for 20 minutes at 150° C. and 4500 lbs./sq. in. pressure. The disc was removed while hot. A well knit, homogeneous, heat- and electrically-resistant piece was obtained.

Example 16

A 50% solution of the isolated, soluble, fusible divinyl benzene polymer in styrene containing 0.5% of benzoyl peroxide based on the total weight was used to impregnate several sheets of asbestos paper. The sheets were superimposed one upon the other and pressed at 150° C. and 1240 lbs./sq. in. for 15 minutes. A well-cured, laminated sheet was obtained. The sheet contained approximately 55% resin.

Example 17

A 50% solution of the isolated, soluble, fusible divinyl benzene polymer in styrene containing 1% by weight of the whole of benzoyl peroxide was used to impregnate a glass cloth. The impregnated material was heated at 50° C. for 4 hours and then overnight at 110° C. The resin constituted 33% of the total weight. No appreciable change in weight was noticed when the impregnated cloth was placed overnight in solutions of 1% and 5% sodium hydroxide and hydrochloric acid, respectively, or a 5M solution of sulfuric acid.

Example 18

| | Parts by weight |
|---|---|
| 75% solution of the isolated, soluble, fusible divinyl benzene polymer | 90 |
| Benzoyl peroxide | 0.45 |
| Carborundum (Grade FFF) | 250 |

A paste was formed from the above ingredients, which was cast at room temperature overnight, then for 24 hours at 50° C. and an equal period at 110° C. A hard, well knit disc suitable for use as a polishing stone was obtained.

Example 19

| | Parts by weight |
|---|---|
| Isolated, soluble, fusible divinyl benzene polymer | 10 |
| Styrene | 5 |
| Benzoyl peroxide | 0.08 |
| Carborundum (Grade FFF) | 50 |

This paste was molded at 140° C. and 4500 lbs./sq. in. pressure, yielding a well-cured disc. Continued heating overnight at 110° C. hardened this abrasive disc still further.

Example 20

A refractory material composed chiefly of calcium and magnesium silicates was placed in a 5% solution of hydrochloric acid for 3½ hours. The refractory piece lost about 4% by weight. Its appearance indicated that disintegration had begun.

When a similar piece was impregnated with a 75% solution of the isolated, soluble, fusible divinyl benzene polymer in styrene containing 0.5% benzoyl peroxide and this baked overnight at 110° C., an acid-resistant, refractory material was obtained. When the impregnated piece was subjected to a 15 hour treatment in 5% hydrochloric acid, no observed decrease in weight was noticed.

Example 21

A 50% solution of the isolated, soluble, fusible divinyl benzene polymer in styrene containing 0.5% benzoyl peroxide by weight of the whole was used as a coating composition. A portion of this solution was poured onto a glass plate and baked at 50° C. and then at 110° C. overnight. A hard, clear, colorless film was obtained.

Example 22

| | Parts by weight |
|---|---|
| Polymerized divinyl benzene dissolved in diethyl benzene | 100 |
| Polystyrene | 10 |

A solution of the above containing a small quantity of benzoyl peroxide was poured onto a glass plate. The solvent was evaporated at 50° C. and the film baked at 110° C. overnight. A hard, clear, colorless film, as in the preceding example, was obtained.

In the above example the polymerized divinyl benzene comprised 23% by weight of the solution in diethyl benzene.

What I claim as new and desire to secure by Letters Patent of the United States is:

1. A composition comprising a hard product of polymerization of a mixture comprising (1) an isolated, fusible partial polymer of divinyl benzene and (2) styrene, the per cent of (1) based on the total amount of (1) and (2) being from 1 to 20 per cent.

2. A hard copolymer obtained by polymerization under heat, and in the presence of a small amount of a polymerization catalyst, of a mixture of (1) an isolated, fusible partial polymer of divinyl benzene and (2) styrene, the per cent of (1) based on the total amount of (1) and (2) being from 1 to 20 per cent.

GAETANO F. D'ALELIO.